US012587778B1

(12) United States Patent
    Chang

(10) Patent No.: US 12,587,778 B1
(45) Date of Patent: Mar. 24, 2026

(54) DOG-SHAPED LOUDSPEAKER BOX

(71) Applicant: Shenzhen Bow Technology Co., Ltd,
            Shenzhen (CN)

(72) Inventor: Yu-Chuan Chang, Shenzhen (CN)

(73) Assignee: **SHENZHEN BOW TECHNOLOGY
            CO., LTD**, Shenzhen (CN)

( * ) Notice: Subject to any disclaimer, the term of this
            patent is extended or adjusted under 35
            U.S.C. 154(b) by 0 days.

(21) Appl. No.: 19/313,123

(22) Filed: Aug. 28, 2025

(30)        Foreign Application Priority Data

Jul. 8, 2025   (CN) .......................... 202510934535.4

(51) Int. Cl.
    *H04R 1/26*          (2006.01)
    *A01K 15/02*         (2006.01)
            (Continued)
(52) U.S. Cl.
    CPC .............. *H04R 1/26* (2013.01); *G06F 3/165*
        (2013.01); *H04R 1/025* (2013.01); *H04R 1/08*
        (2013.01); *H04R 3/00* (2013.01); *A01K 15/025*
            (2013.01); *A63H 11/20* (2013.01); *B25J
            9/0009* (2013.01); *B25J 11/008* (2013.01);
        *B25J 19/061* (2013.01); *H04R 5/02* (2013.01);
                        *H04R 27/00* (2013.01);
            (Continued)
(58) Field of Classification Search
    CPC . H04R 1/26; H04R 1/025; H04R 1/08; H04R
            3/00; H04R 2205/022; H04R 5/02; H04R
            27/00; G06F 3/165; A01K 15/025; B25J
            9/0009; B25J 19/061; B25J 11/008
    See application file for complete search history.

(56)            References Cited

U.S. PATENT DOCUMENTS 5,850,460  A  * 12/1998  Tanaka ................. H04R 1/2834
                                                    381/186
    7,441,630  B1 * 10/2008  Herrington ............ H04R 1/026
                                                    181/198
                    (Continued)

FOREIGN PATENT DOCUMENTS

CN        201813501 U  * 4/2011
    CN        110393922 A  * 11/2019   ............... A63H 3/36
                    (Continued)

*Primary Examiner* — Carolyn R Edwards
*Assistant Examiner* — Kuassi A Ganmavo
(74) *Attorney, Agent, or Firm* — MUNCY, GEISSLER,
OLDS & LOWE, P.C.

(57)            ABSTRACT

A dog-shaped loudspeaker box, the loudspeaker box
includes a housing and an audio component, where the audio
component includes a control main board and a loudspeaker
unit; low-frequency loudspeakers and low-frequency radia-
tion diaphragms are respectively arranged inside a foreleg
chamber and a hind leg chamber; a front high-frequency
loudspeaker is arranged inside a head chamber, and a rear
high-frequency loudspeaker is arranged inside a tail cham-
ber. The low-frequency loudspeakers in corresponding fre-
quency bands in forelegs and hind legs correspond to each
other, the low-frequency radiation diaphragms in corre-
sponding frequency bands correspond to each other, the
low-frequency loudspeakers and the low-frequency radia-
tion diaphragms cooperate with the chambers to form the
resonant bass effect, and high frequencies are located at the
head and tail of a dog, so that the clear and vivid stereo-
phonic effect can be formed.

13 Claims, 4 Drawing Sheets

(51) Int. Cl.

| | |
|---|---|
| *A63H 11/20* | (2006.01) |
| *B25J 9/00* | (2006.01) |
| *B25J 11/00* | (2006.01) |
| *B25J 19/06* | (2006.01) |
| *G06F 3/16* | (2006.01) |
| *H04R 1/02* | (2006.01) |
| *H04R 1/08* | (2006.01) |
| *H04R 3/00* | (2006.01) |
| *H04R 5/02* | (2006.01) |
| *H04R 27/00* | (2006.01) |

(52) U.S. Cl.
CPC .. *H04R 2201/028* (2013.01); *H04R 2205/022*
(2013.01)

(56) References Cited

U.S. PATENT DOCUMENTS

| | | | | |
|---|---|---|---|---|
| 7,442,107 B1 * | 10/2008 | Ueda | | A63H 11/20 |
| | | | | 446/175 |
| 9,071,897 B1 * | 6/2015 | Johnston | | H04R 5/02 |
| 9,119,000 B2 * | 8/2015 | Tracy | | H04R 1/26 |
| D910,900 S * | 2/2021 | Cheng | | D26/98 |
| 2001/0029147 A1 * | 10/2001 | Hornsby | | A63H 11/20 |
| | | | | 446/298 |
| 2002/0052672 A1 * | 5/2002 | Osawa | | G06N 3/008 |
| | | | | 700/245 |
| 2006/0078144 A1 * | 4/2006 | Stiles | | H04R 1/345 |
| | | | | 381/87 |
| 2008/0233829 A1 * | 9/2008 | Sayles | | A45C 1/12 |
| | | | | 446/8 |
| 2009/0055019 A1 * | 2/2009 | Stiehl | | B25J 9/1671 |
| | | | | 901/17 |
| 2014/0193005 A1 * | 7/2014 | Riggs | | H04R 5/02 |
| | | | | 381/300 |
| 2016/0088386 A1 * | 3/2016 | Crosswell | | H04R 1/025 |
| | | | | 381/349 |
| 2016/0219362 A1 * | 7/2016 | Litovsky | | H04R 1/2834 |
| 2018/0035210 A1 * | 2/2018 | Wang | | H04R 5/02 |
| 2018/0220213 A1 * | 8/2018 | Wu | | H04R 1/26 |
| 2018/0270567 A1 * | 9/2018 | Litovsky | | H04R 1/26 |
| 2019/0247760 A1 * | 8/2019 | Qi | | A63H 3/02 |
| 2021/0275932 A1 * | 9/2021 | Fink | | A63H 29/22 |
| 2022/0394369 A1 | 12/2022 | Yang et al. | | |
| 2024/0367066 A1 * | 11/2024 | Takahashi | | B25J 5/00 |

FOREIGN PATENT DOCUMENTS

| | | | | | |
|---|---|---|---|---|---|
| CN | 211585208 U | * | 9/2020 | | |
| CN | 211916896 U | * | 11/2020 | | |
| CN | 212044743 U | * | 12/2020 | | |
| CN | 212631711 U | * | 3/2021 | | |
| CN | 114684291 A | * | 7/2022 | | B62D 57/028 |
| CN | 218603588 U | * | 3/2023 | | |
| KR | 20120015667 A | * | 2/2012 | | H04R 1/26 |

* cited by examiner

DOG-SHAPED LOUDSPEAKER BOX

TECHNICAL FIELD

The present disclosure relates to the technical field of audio products, in particular to a dog-shaped loudspeaker box.

BACKGROUND

An audio system is an important audio-visual apparatus, and can enhance people's appreciation effects of music and movies. In this digital age, there are higher and higher requirements for the design of the audio system. The audio system should have the beautiful appearance as well as the good sound effect. Moreover, a loudspeaker box itself requires that the audio layout design meets the acoustic requirements. Thus, it is difficult for the complex appearance to meet the requirements of the loudspeaker box. Therefore, the loudspeaker box balancing the appearance and the sound effect becomes an issue to be addressed.

SUMMARY

The present disclosure aims to solve the problem that an existing loudspeaker box cannot balance the appearance and the sound effect.

The technical solution adopted to solve the technical problem put forward by the present disclosure is as follows: a dog-shaped loudspeaker box in the present disclosure includes a housing and an audio component arranged inside the housing, where the audio component includes a control main board and a loudspeaker unit connected to the control main board; the housing is a dog-shaped housing; the loudspeaker unit includes high-frequency loudspeakers, low-frequency loudspeakers, and low-frequency radiation diaphragms; a sealed foreleg chamber corresponding to forelegs of a dog is arranged inside the housing; a sealed hind leg chamber corresponding to hind legs of the dog is arranged inside the housing; the low-frequency loudspeakers include front low-frequency loudspeakers arranged inside the foreleg chamber and rear low-frequency loudspeakers arranged inside the hind leg chamber, and the front low-frequency loudspeakers and the rear low-frequency loudspeakers are arranged opposite to each other; the low-frequency radiation diaphragms include front low-frequency radiation diaphragms arranged inside the foreleg chamber and rear low-frequency radiation diaphragms arranged inside the hind leg chamber, and the front low-frequency radiation diaphragms and the rear low-frequency radiation diaphragms are arranged opposite to each other; the front low-frequency loudspeakers and the front low-frequency radiation diaphragms are arranged in parallel; front lower sound output holes corresponding to the front low-frequency loudspeakers and the front low-frequency radiation diaphragms are provided in the housing; the rear low-frequency loudspeakers and the rear low-frequency radiation diaphragms are arranged in parallel; rear lower sound output holes corresponding to the rear low-frequency loudspeakers and the rear low-frequency radiation diaphragms are provided in the housing; a head chamber corresponding to the head of the dog is arranged inside the housing; a tail chamber corresponding to the tail of the dog is arranged inside the housing; the high-frequency loudspeakers include a front high-frequency loudspeaker arranged inside the head chamber and a rear high-frequency loudspeaker arranged inside the tail chamber; front upper sound output holes are provided in the head chamber; and rear upper sound output holes are provided in the tail chamber.

The technical solutions further defining the present disclosure include the following features:

the front low-frequency loudspeakers and the front low-frequency radiation diaphragms face an upper front side, and the rear low-frequency loudspeakers and the rear low-frequency radiation diaphragms face an upper rear side.

The two front low-frequency loudspeakers are arranged horizontally, the two front low-frequency radiation diaphragms are arranged horizontally, the two rear low-frequency loudspeakers are arranged horizontally, the two rear low-frequency radiation diaphragms are arranged horizontally, the front low-frequency radiation diaphragms are located below the front low-frequency loudspeakers, and the rear low-frequency radiation diaphragms are located below the rear low-frequency loudspeakers.

An encoder rotary switch corresponding to the nose of the dog is arranged on a wall of the head chamber, a button corresponding to the encoder rotary switch is arranged inside the head chamber, and the encoder rotary switch is clamped with the wall of the head chamber.

An ear chamber corresponding to ears of the dog is arranged on the housing; a body chamber corresponding to the body of the dog is arranged on the housing; a neck chamber corresponding to the neck of the dog is arranged on the housing; the head chamber, the neck chamber, the body chamber and the tail chamber are arranged integrally and are collectively referred to as a central chamber; the central chamber includes a left housing and a right housing which are arranged vertically, and the left housing and the right housing are detachably connected; and the ear chamber, the foreleg chamber and the hind leg chamber are respectively inserted into the left housing and the right housing to be fixedly connected to the left housing and the right housing.

The left housing is provided with head chamber mounting columns, foreleg chamber mounting columns, and hind leg chamber mounting columns in a horizontal direction; the left housing and the right housing are provided with an ear chamber mounting groove, a foreleg chamber mounting groove, and a hind leg chamber mounting groove; an ear chamber mounting portion matched with the ear chamber mounting groove is arranged at the bottom of the ear chamber; ear chamber mounting holes matched with ear chamber mounting columns are provided in the ear chamber mounting portion; a foreleg chamber mounting portion matched with the foreleg chamber mounting groove is arranged at the top of the foreleg chamber; foreleg chamber mounting holes matched with the foreleg chamber mounting columns are provided in the foreleg chamber mounting portion; a hind leg chamber mounting portion matched with the hind leg chamber mounting groove is arranged at the top of the hind leg chamber; and hind leg chamber mounting holes matched with the hind leg chamber mounting columns are provided in the hind leg chamber mounting portion.

The control main board is located inside the body chamber; the ear chamber mounting portion is provided with an ear wire routing hole in communication with the central chamber; the foreleg chamber mounting portion is provided with a foreleg wire routing hole in communication with the bottom of the central chamber; and the hind leg chamber mounting portion is provided with a hind leg wire routing hole in communication with the bottom of the central chamber.

The loudspeaker box further includes a battery, where a battery compartment is arranged inside the ear chamber, the battery is located inside the battery compartment, and a charging interface connected to the control main board is arranged on a wall of the foreleg chamber or a wall of the hind leg chamber.

The ear chamber includes a front ear housing and a rear ear housing, and the front ear housing and the rear ear housing are detachably connected through screws; the foreleg chamber includes a foreleg front housing, a foreleg middle housing, and a foreleg rear housing, the foreleg front housing and the foreleg middle housing form a sealed chamber, the front low-frequency loudspeakers and the front low-frequency radiation diaphragms are mounted on the foreleg front housing, magnets of the front low-frequency loudspeakers abut against the foreleg middle housing, and the foreleg front housing, the foreleg middle housing and the foreleg rear housing are connected through screws; and the hind leg chamber includes a hind leg front housing, a hind leg middle housing, and a hind leg rear housing, the hind leg middle housing and the hind leg rear housing form a sealed chamber, the rear low-frequency loudspeakers and the rear low-frequency radiation diaphragms are mounted on the hind leg rear housing, magnets of the rear low-frequency loudspeakers abut against the hind leg middle housing, and the hind leg front housing, the hind leg middle housing and the hind leg rear housing are connected through screws.

The front lower sound output holes and the rear lower sound output holes include first sound output holes corresponding to the low-frequency loudspeakers and second sound output holes corresponding to the low-frequency radiation diaphragms; the first sound output holes include a plurality of holes uniformly distributed with the centers of the low-frequency loudspeakers serving as the circle centers; the second sound output holes include a plurality of holes uniformly distributed with the centers of the low-frequency radiation diaphragms serving as the circle centers; and the first sound output holes and the second sound output holes are gradually reduced from the centers to edges.

The control main board is further provided with a voice module, and a microphone corresponding to an ear portion of the dog and connected to the control main board is arranged on the housing.

A touch-control music switching button corresponding to an ear portion of the dog and connected to the control main board is arranged on the housing.

The housing is made of a transparent material.

By means of the above technical solutions, the present disclosure has the beneficial effects as follows: the housing of the dog-shaped loudspeaker box in the present disclosure is dog-shaped; the low-frequency loudspeakers and the low-frequency radiation diaphragms are respectively arranged inside the foreleg chamber and the hind leg chamber; the front low-frequency loudspeakers and the rear low-frequency loudspeakers are arranged opposite to each other; the front low-frequency radiation diaphragms and the rear low-frequency radiation diaphragms are arranged opposite to each other; the front low-frequency loudspeakers and the front low-frequency radiation diaphragms are arranged in parallel; the rear low-frequency loudspeakers and the rear low-frequency radiation diaphragms are arranged in parallel; the front high-frequency loudspeaker is arranged inside the head chamber; and the rear high-frequency loudspeaker is arranged inside the tail chamber. The low-frequency loudspeakers in corresponding frequency bands in forelegs and hind legs correspond to each other, the low-frequency radiation diaphragms in corresponding frequency bands correspond to each other, the low-frequency loudspeakers and the low-frequency radiation diaphragms cooperate with the chambers to form the resonant bass effect, and high frequencies are located at the head and tail of a dog, so that the clear and vivid stereophonic effect can be formed, and the attractiveness of the dog shape as well as the high-quality sound effect is achieved.

Figure 1:
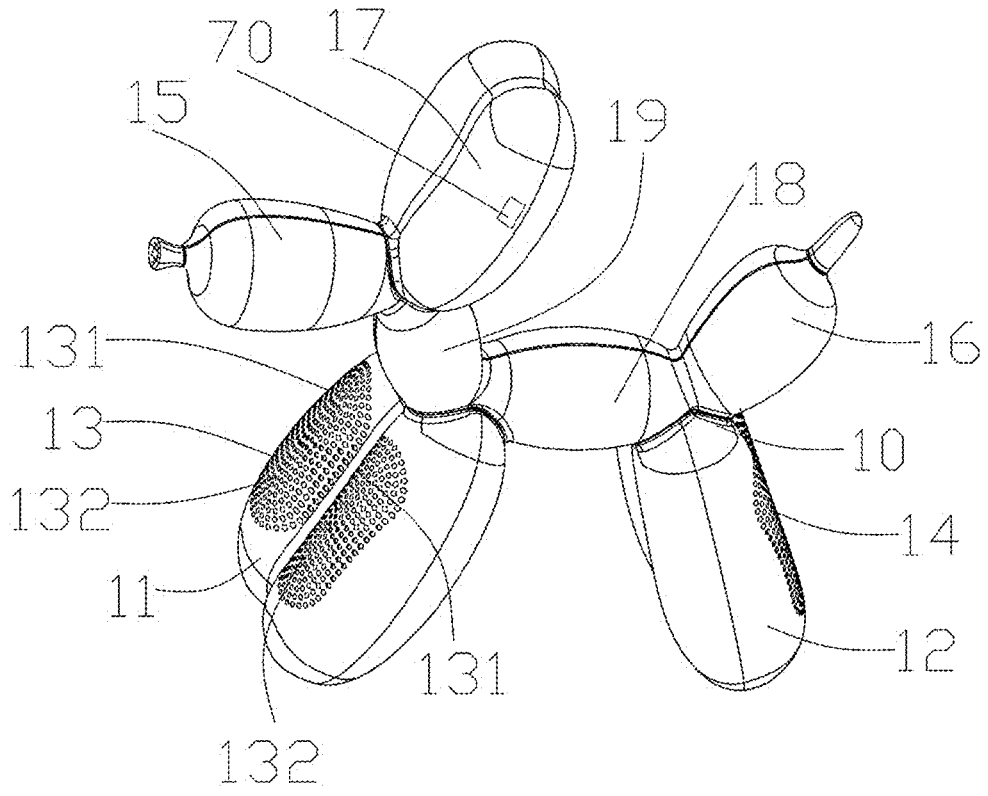
FIG. 1 is a three-dimensional structure diagram of a dog-shaped loudspeaker box in the present disclosure.

In the drawings, housing 10, foreleg chamber 11, foreleg front housing 1101, foreleg middle housing 1102, foreleg rear housing 1103, foreleg chamber mounting portion 111, foreleg chamber mounting hole 112, foreleg wire routing hole 113, hind leg chamber 12, hind leg front housing 1201, hind leg middle housing 1202, hind leg rear housing 1203, hind leg chamber mounting portion 121, hind leg chamber mounting hole 122, hind leg wire routing hole 123, front lower sound output hole 13, first sound output hole 131, second sound output hole 132, rear lower sound output hole 14, head chamber 15, front upper sound output hole 151, tail chamber 16, rear upper sound output hole 161, ear chamber 17, front ear housing 1701, rear ear housing 1702, ear chamber mounting portion 171, ear chamber mounting hole 172, ear wire routing hole 173, battery compartment 174, body chamber 18, neck chamber 19, audio component 20, control main board 21, loudspeaker unit 22, high-frequency loudspeaker 221, front high-frequency loudspeaker 2211, rear high-frequency loudspeaker 2212, low-frequency loudspeaker 222, front low-frequency loudspeaker 2221, rear low-frequency loudspeaker 2222, low-frequency radiation diaphragm 223, front low-frequency radiation diaphragm 2231, rear low-frequency radiation diaphragm 2232, encoder rotary switch 23, button 24, central chamber 30, left housing 31, head chamber mounting column 311, foreleg chamber mounting column 312, hind leg chamber mounting column 313, right housing 32, ear chamber mounting groove 33, foreleg chamber mounting groove 34, hind leg chamber mounting groove 35, battery 40, microphone 50, charging interface 60, touch-control music switching button 70.

DETAILED DESCRIPTION OF THE EMBODIMENTS

The structure of the present disclosure is further described in conjunction with the accompanying drawings below.

Figure 2:
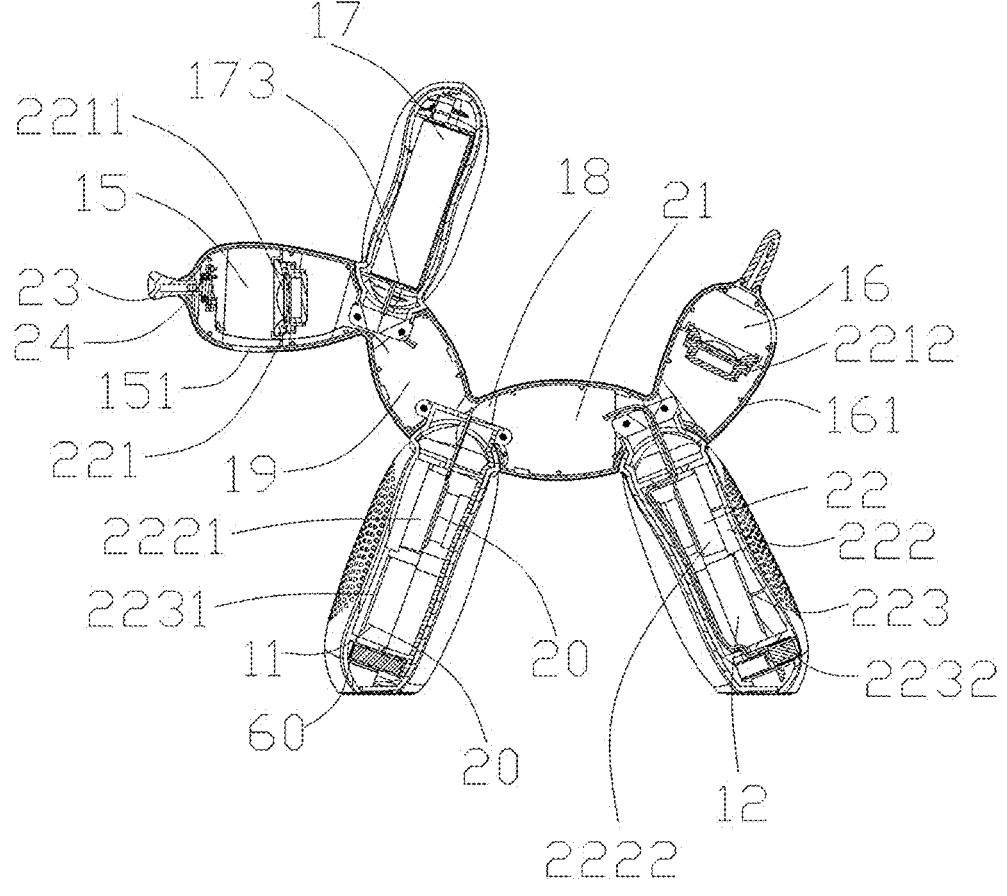
FIG. 2 is a sectional structure diagram of a dog-shaped loudspeaker box in the present disclosure.
Figure 3:
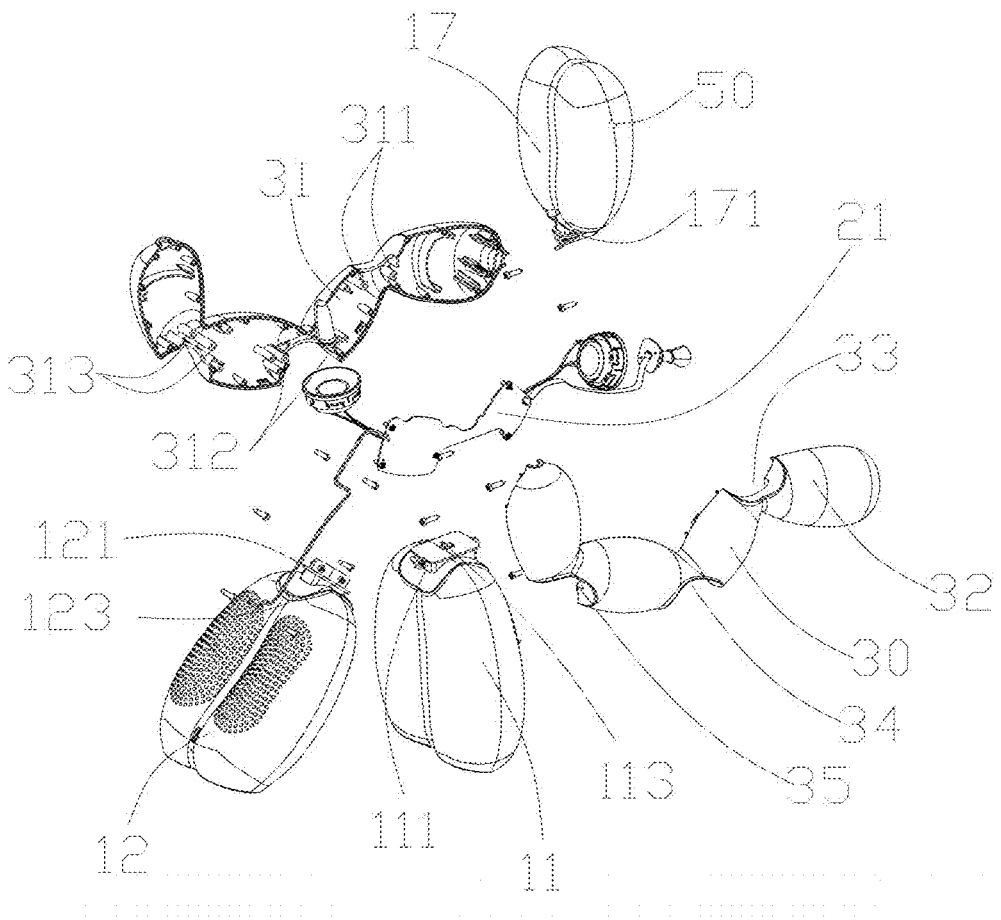
FIG. 3 is an exploded structure diagram of a dog-shaped loudspeaker box in the present disclosure.
Figure 4:
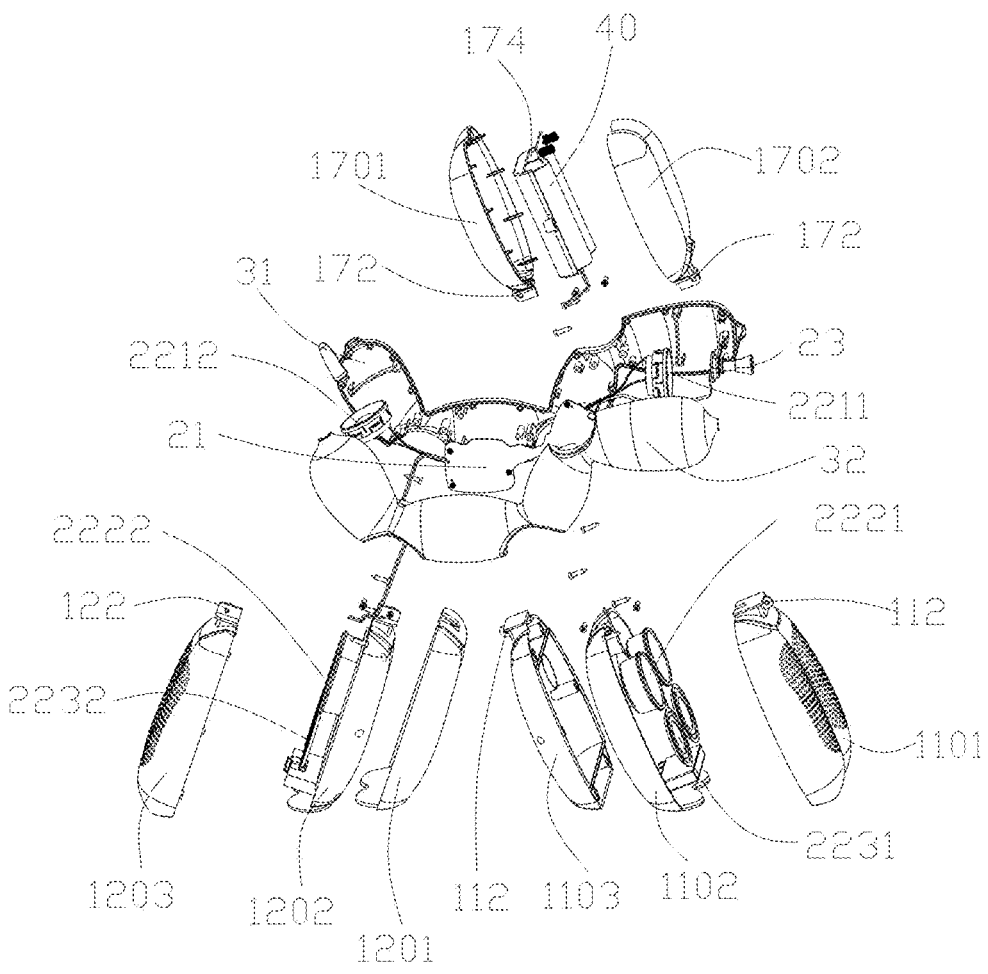
FIG. 4 is an exploded structure diagram of a dog-shaped loudspeaker box in the present disclosure.

Reference is made to FIG. 1 to FIG. 4. A dog-shaped loudspeaker box in the present disclosure includes a housing 10 and an audio component 20 arranged inside the housing 10, where the audio component 20 includes a control main board 21 and a loudspeaker unit 22 connected to the control main board 21; and the housing 10 is a dog-shaped housing 10. In this embodiment, the housing 10 is made of a transparent plastic material. The shape with the transparent plastic characteristic is exquisite and beautiful, the housing is transparent, and an internal structure of the housing can be clearly seen. The loudspeaker unit 22 includes high-frequency loudspeakers 221, low-frequency loudspeakers 222, and low-frequency radiation diaphragms 223; a sealed foreleg chamber 11 corresponding to forelegs of a dog is arranged inside the housing 10; a sealed hind leg chamber 12 corresponding to hind legs of the dog is arranged inside the housing 10; the low-frequency loudspeakers 222 include front low-frequency loudspeakers 2221 arranged inside the foreleg chamber and rear low-frequency loudspeakers 2222 arranged inside the hind leg chamber, and the front low-frequency loudspeakers 2221 and the rear low-frequency loudspeakers 2222 are arranged opposite to each other; the low-frequency radiation diaphragms 223 include front low-frequency radiation diaphragms 2231 arranged inside the foreleg chamber and rear low-frequency radiation diaphragms 2232 arranged inside the hind leg chamber, and the front low-frequency radiation diaphragms 2231 and the rear low-frequency radiation diaphragms 2232 are arranged opposite to each other; the front low-frequency loudspeakers 2221 and the front low-frequency radiation diaphragms 2231 are arranged in parallel; front lower sound output holes 13 corresponding to the front low-frequency loudspeakers 2221 and the front low-frequency radiation diaphragms 2231 are provided in the housing 10; the rear low-frequency loudspeakers 2222 and the rear low-frequency radiation diaphragms 2232 are arranged in parallel; and rear lower sound output holes 14 corresponding to the rear low-frequency loudspeakers 2222 and the rear low-frequency radiation diaphragms 2232 are provided in the housing 10. In this embodiment, the front lower sound output holes 13 and the rear lower sound output holes 14 include first sound output holes 131 corresponding to the low-frequency loudspeakers and second sound output holes 132 corresponding to the low-frequency radiation diaphragms; the first sound output holes include a plurality of holes uniformly distributed with the centers of the low-frequency loudspeakers serving as the circle centers; the second sound output holes include a plurality of holes uniformly distributed with the centers of the low-frequency radiation diaphragms serving as the circle centers; and the first sound output holes and the second sound output holes are gradually reduced from the centers to edges. The low-frequency loudspeakers and the low-frequency radiation diaphragms have the maximum sound output volumes at the centers, so that the holes corresponding to the central portions are larger than the holes on the edges, thereby achieving the optimal sound effect. In this embodiment, the front low-frequency loudspeakers 2221 and the front low-frequency radiation diaphragms 2231 face an upper front side, and the rear low-frequency loudspeakers 2222 and the rear low-frequency radiation diaphragms 2232 face an upper rear side. Thus, sounds can reach human ears naturally, thereby achieving the optimal auditory effect. In this embodiment, the two front low-frequency loudspeakers 2221 are arranged horizontally, the two front low-frequency radiation diaphragms 2231 are arranged horizontally, the two rear low-frequency loudspeakers 2222 are arranged horizontally, the two rear low-frequency radiation diaphragms 2232 are arranged horizontally, the front low-frequency radiation diaphragms 2231 are located below the front low-frequency loudspeakers 2221, and the rear low-frequency radiation diaphragms 2232 are located below the rear low-frequency loudspeakers 2222. Thus, various bass frequency bands can be output clearly. Besides, the bass and the sealed chambers form the resonant bass effect, thereby achieving the 360-degree surrounding sound effect. A head chamber 15 corresponding to the head of the dog is arranged inside the housing 10; a tail chamber 16 corresponding to the tail of the dog is arranged inside the housing 10; the high-frequency loudspeakers 221 include a front high-frequency loudspeaker 2211 arranged inside the head chamber 15 and a rear high-frequency loudspeaker 2212 arranged inside the tail chamber 16; front upper sound output holes

151 are provided in the head chamber 15; and rear upper sound output holes 161 are provided in the tail chamber 16. According to the layout of the loudspeaker unit, the high-frequency loudspeakers are located above, the low-frequency loudspeakers are located below, and a multi-track system layout is adopted, thereby achieving the optimal auditory effect. The housing 10 of the dog-shaped loudspeaker box in the present disclosure is dog-shaped, the low frequencies are located in four limbs of the dog, and the high frequencies are located at the head and tail of the dog, so that the clear and vivid stereophonic effect can be formed, and the attractiveness of the dog shape as well as the high-quality sound effect is achieved.

In this embodiment, an ear chamber 17 corresponding to ears of the dog is arranged on the housing 10; a body chamber 18 corresponding to the body of the dog is arranged on the housing 10; a neck chamber 19 corresponding to the neck of the dog is arranged on the housing 10; the head chamber 15, the neck chamber 19, the body chamber 18 and the tail chamber 16 are arranged integrally and are collectively referred to as a central chamber 30; the central chamber 30 includes a left housing 31 and a right housing 32 which are arranged vertically, and the left housing 31 and the right housing 32 are detachably connected; and the ear chamber 17, the foreleg chamber and the hind leg chamber are respectively inserted into the left housing 31 and the right housing 32 to be fixedly connected to the left housing 31 and the right housing 32.

In this embodiment, the left housing 31 is provided with ear chamber mounting columns 311, foreleg chamber mounting columns 312, and hind leg chamber mounting columns 313 in a horizontal direction; the left housing 31 and the right housing 32 are provided with an ear chamber mounting groove 33, a foreleg chamber mounting groove 34, and a hind leg chamber mounting groove 35; an ear chamber mounting portion 171 matched with the ear chamber mounting groove 33 is arranged at the bottom of the ear chamber 17; ear chamber mounting holes 172 matched with the ear chamber mounting columns 311 are provided in the ear chamber mounting portion 171; and the ear chamber 17 includes a front ear housing 1701 and a rear ear housing 1702, and the front ear housing 1701 and the rear ear housing 1702 are detachably connected through screws. In this embodiment, the loudspeaker box further includes a battery 40, a battery compartment 174 is arranged inside the ear chamber 17, and the battery 40 is located inside the battery compartment 174. The battery compartment 174 and the rear ear housing 1702 are fixedly connected through screws. During mounting, the battery and the battery compartment are first mounted, then the front ear housing 1701 and the rear ear housing 1702 are fixedly connected through screws, the ear chamber mounting portion is inserted into the ear chamber mounting groove, and the ear chamber mounting holes 172 and the ear chamber mounting columns 311 are mounted and fixed through screws.

A foreleg chamber mounting portion 111 matched with the foreleg chamber mounting groove 34 is arranged at the top of the foreleg chamber 11; foreleg chamber mounting holes 112 matched with the foreleg chamber mounting columns 312 are provided in the foreleg chamber mounting portion 111; and the foreleg chamber 11 includes a foreleg front housing 1101, a foreleg middle housing 1102, and a foreleg rear housing 1103, the foreleg front housing 1101 and the foreleg middle housing 1102 form a sealed chamber, the front low-frequency loudspeakers 2221 and the front low-frequency radiation diaphragms 2231 are mounted on the foreleg front housing 1101, magnets of the front low-frequency loudspeakers 2221 abut against the foreleg middle housing 1102, and the foreleg front housing 1101, the foreleg middle housing 1102 and the foreleg rear housing 1103 are connected through screws. During mounting of the foreleg chamber 11, the foreleg chamber mounting portion 111 is inserted into the foreleg chamber mounting groove 34, and the foreleg chamber mounting holes 112 and the foreleg chamber mounting columns 312 are mounted and fixed through screws.

A hind leg chamber mounting portion 121 matched with the hind leg chamber mounting groove 35 is arranged at the top of the hind leg chamber 12; and hind leg chamber mounting holes 122 matched with the hind leg chamber mounting columns 313 are provided in the hind leg chamber mounting portion 121. The hind leg chamber 12 includes a hind leg front housing 1201, a hind leg middle housing 1202, and a hind leg rear housing 1203, the hind leg middle housing 1202 and the hind leg rear housing 1203 form a sealed chamber, the rear low-frequency loudspeakers 2222 and the rear low-frequency radiation diaphragms 2232 are mounted on the hind leg rear housing 1203, magnets of the rear low-frequency loudspeakers 2222 abut against the hind leg middle housing 1202, and the hind leg front housing 1201, the hind leg middle housing 1202 and the hind leg rear housing 1203 are connected through screws. During mounting of the hind leg chamber 12, the hind leg chamber mounting portion 121 is inserted into the hind leg chamber mounting groove 35, and the hind leg chamber mounting holes 122 and the hind leg chamber mounting columns 313 are mounted and fixed through screws. The overall chamber components are reasonable and compact and are easy and convenient to mount.

In this embodiment, the control main board 21 is located inside the body chamber 18; the ear chamber mounting portion 171 is provided with an ear wire routing hole 173 in communication with the central chamber 30, and an electric wire is connected to the control main board through the ear wire routing hole 173; the foreleg chamber mounting portion 111 is provided with a foreleg wire routing hole 113 in communication with the bottom of the central chamber 30, and wires of the front low-frequency loudspeakers 2221 are connected to the control main board through the foreleg wire routing hole; the hind leg chamber mounting portion is provided with a hind leg wire routing hole 123 in communication with the bottom of the central chamber 30, and the rear low-frequency loudspeakers 2222 are connected to the control main board through the hind leg wire routing hole 123; and the front high-frequency loudspeaker 2211 and the rear high-frequency loudspeaker 2212 are directly connected to the control main board through the communicating central chamber 30, so that the layout is compact, and the overall mounting is easy and convenient.

In this embodiment, an encoder rotary switch 23 corresponding to the nose of the dog is arranged on a wall of the head chamber 15, a button 24 corresponding to the encoder rotary switch 23 is arranged inside the head chamber 15, and the encoder rotary switch 23 is clamped with the wall of the head chamber through a snap fastener. The volume can be adjusted through the encoder rotary switch, and pausing and playing can be controlled by pressing the encoder rotary switch and the button. The arrangement of the selector switch conforms to ergonomic principles, and it is convenient to operate.

In this embodiment, the control main board 21 is further provided with a voice module, and a microphone 50 corresponding to the ear portion of the dog and connected to the control main board 21 is arranged on the housing 10, so that control and wake-up can be performed through voices, and the operation is facilitated. A charging interface 60 connected to the control main board 21 is arranged on a wall of the foreleg chamber or a wall of the hind leg chamber, and the charging interface 60 is configured to charge the battery, thereby facilitating carrying and use.

In this embodiment, a touch-control music switching button 70 corresponding to an ear portion of the dog and connected to the control main board is arranged on the housing 10, thereby facilitating switching and adjusting of previous and next music.

Although the embodiments of the present disclosure are described in detail in conjunction with the accompanying drawings, they should not be understood as limitations on the scope of protection of the present disclosure. Within the scope described in the claims, various amendments and transformations made by a person skilled in the art without involving any inventive effort still fall within the scope of protection of the present disclosure.

The invention claimed is:

1. A dog-shaped loudspeaker box, comprising a housing and an audio component arranged inside the housing, wherein the audio component comprises a control main board and a loudspeaker unit connected to the control main board; the housing is a dog-shaped housing; the loudspeaker unit comprises high-frequency loudspeakers, low-frequency loudspeakers, and low-frequency radiation diaphragms; a sealed foreleg chamber corresponding to forelegs of a dog is arranged inside the housing; a sealed hind leg chamber corresponding to hind legs of the dog is arranged inside the housing; the low-frequency loudspeakers comprise front low-frequency loudspeakers arranged inside the foreleg chamber and rear low-frequency loudspeakers arranged inside the hind leg chamber, and the front low-frequency loudspeakers and the rear low-frequency loudspeakers are arranged opposite to each other; the low-frequency radiation diaphragms comprise front low-frequency radiation diaphragms arranged inside the foreleg chamber and rear low-frequency radiation diaphragms arranged inside the hind leg chamber, and the front low-frequency radiation diaphragms and the rear low-frequency radiation diaphragms are arranged opposite to each other; the front low-frequency loudspeakers and the front low-frequency radiation diaphragms are arranged in parallel; front lower sound output holes corresponding to the front low-frequency loudspeakers and the front low-frequency radiation diaphragms are provided in the housing; the rear low-frequency loudspeakers and the rear low-frequency radiation diaphragms are arranged in parallel; rear lower sound output holes corresponding to the rear low-frequency loudspeakers and the rear low-frequency radiation diaphragms are provided in the housing; a head chamber corresponding to the head of the dog is arranged inside the housing; a tail chamber corresponding to the tail of the dog is arranged inside the housing; the high-frequency loudspeakers comprise a front high-frequency loudspeaker arranged inside the head chamber and a rear high-frequency loudspeaker arranged inside the tail chamber; front upper sound output holes are provided in the head chamber; and rear upper sound output holes are provided in the tail chamber.

2. The dog-shaped loudspeaker box according to claim 1, wherein the front low-frequency loudspeakers and the front low-frequency radiation diaphragms face an upper front side, and the rear low-frequency loudspeakers and the rear low-frequency radiation diaphragms face an upper rear side.

3. The dog-shaped loudspeaker box according to claim 1, wherein the two front low-frequency loudspeakers are arranged horizontally, the two front low-frequency radiation diaphragms are arranged horizontally, the two rear low-frequency loudspeakers are arranged horizontally, the two rear low-frequency radiation diaphragms are arranged horizontally, the front low-frequency radiation diaphragms are located below the front low-frequency loudspeakers, and the rear low-frequency radiation diaphragms are located below the rear low-frequency loudspeakers.

4. The dog-shaped loudspeaker box according to claim 1, wherein an encoder rotary switch corresponding to the nose of the dog is arranged on a wall of the head chamber, a button corresponding to the encoder rotary switch is arranged inside the head chamber, and the encoder rotary switch is clamped with the wall of the head chamber.

5. The dog-shaped loudspeaker box according to claim 1, wherein an ear chamber corresponding to ears of the dog is arranged on the housing; a body chamber corresponding to the body of the dog is arranged on the housing; a neck chamber corresponding to the neck of the dog is arranged on the housing; the head chamber, the neck chamber, the body chamber and the tail chamber are arranged integrally and are collectively referred to as a central chamber; the central chamber comprises a left housing and a right housing which are arranged vertically, and the left housing and the right housing are detachably connected; and the ear chamber, the foreleg chamber and the hind leg chamber are respectively inserted into the left housing and the right housing to be fixedly connected to the left housing and the right housing.

6. The dog-shaped loudspeaker box according to claim 5, wherein the left housing is provided with head chamber mounting columns, foreleg chamber mounting columns, and hind leg chamber mounting columns in a horizontal direction; the left housing and the right housing are provided with an ear chamber mounting groove, a foreleg chamber mounting groove, and a hind leg chamber mounting groove; an ear chamber mounting portion matched with the ear chamber mounting groove is arranged at the bottom of the ear chamber; ear chamber mounting holes matched with ear chamber mounting columns are provided in the ear chamber mounting portion; a foreleg chamber mounting portion matched with the foreleg chamber mounting groove is arranged at the top of the foreleg chamber; foreleg chamber mounting holes matched with the foreleg chamber mounting columns are provided in the foreleg chamber mounting portion; a hind leg chamber mounting portion matched with the hind leg chamber mounting groove is arranged at the top of the hind leg chamber; and hind leg chamber mounting holes matched with the hind leg chamber mounting columns are provided in the hind leg chamber mounting portion.

7. The dog-shaped loudspeaker box according to claim 5, wherein the control main board is located inside the body chamber; the ear chamber mounting portion is provided with an ear wire routing hole in communication with the central chamber; the foreleg chamber mounting portion is provided with a foreleg wire routing hole in communication with the bottom of the central chamber; and the hind leg chamber mounting portion is provided with a hind leg wire routing hole in communication with the bottom of the central chamber.

8. The dog-shaped loudspeaker box according to claim 7, further comprising a battery, wherein a battery compartment is arranged inside the ear chamber, the battery is located inside the battery compartment, and a charging interface connected to the control main board is arranged on a wall of the foreleg chamber or a wall of the hind leg chamber.

9. The dog-shaped loudspeaker box according to claim 5, wherein the ear chamber comprises a front ear housing and a rear ear housing, and the front ear housing and the rear ear housing are detachably connected through screws; the foreleg chamber comprises a foreleg front housing, a foreleg middle housing, and a foreleg rear housing, the foreleg front housing and the foreleg middle housing form a sealed chamber, the front low-frequency loudspeakers and the front low-frequency radiation diaphragms are mounted on the foreleg front housing, magnets of the front low-frequency loudspeakers abut against the foreleg middle housing, and the foreleg front housing, the foreleg middle housing and the foreleg rear housing are connected through screws; and the hind leg chamber comprises a hind leg front housing, a hind leg middle housing, and a hind leg rear housing, the hind leg middle housing and the hind leg rear housing form a sealed chamber, the rear low-frequency loudspeakers and the rear low-frequency radiation diaphragms are mounted on the hind leg rear housing, magnets of the rear low-frequency loudspeakers abut against the hind leg middle housing, and the hind leg front housing, the hind leg middle housing and the hind leg rear housing are connected through screws.

10. The dog-shaped loudspeaker box according to claim 1, wherein the front lower sound output holes and the rear lower sound output holes comprise first sound output holes corresponding to the low-frequency loudspeakers and second sound output holes corresponding to the low-frequency radiation diaphragms; the first sound output holes comprise a plurality of holes uniformly distributed with the centers of the low-frequency loudspeakers serving as the circle centers; the second sound output holes comprise a plurality of holes uniformly distributed with the centers of the low-frequency radiation diaphragms serving as the circle centers; and the first sound output holes and the second sound output holes are gradually reduced from the centers to edges.

11. The dog-shaped loudspeaker box according to claim 1, wherein the control main board is further provided with a voice module, and a microphone corresponding to an ear portion of the dog and connected to the control main board is arranged on the housing.

12. The dog-shaped loudspeaker box according to claim 1, wherein a touch-control music switching button corresponding to an ear portion of the dog and connected to the control main board is arranged on the housing.

13. The dog-shaped loudspeaker box according to claim 1, wherein the housing is made of a transparent material.

* * * * *